United States Patent
Min et al.

(10) Patent No.: US 9,852,531 B2
(45) Date of Patent: Dec. 26, 2017

(54) ELECTRONIC APPARATUS AND METHOD FOR CONTROLLING THE SAME

(71) Applicant: SAMSUNG ELECTRONICS CO., LTD., Suwon-si (KR)

(72) Inventors: Byung-seok Min, Seoul (KR); Il-soon Lim, Hongseong-gun (KR); Seung-ho Park, Seoul (KR); Seul-ki Jang, Suwon-si (KR); Jong-ho Kim, Seongnam-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/727,982

(22) Filed: Jun. 2, 2015

(65) Prior Publication Data

US 2016/0012572 A1 Jan. 14, 2016

Related U.S. Application Data

(60) Provisional application No. 62/023,473, filed on Jul. 11, 2014.

(30) Foreign Application Priority Data

Sep. 12, 2014 (KR) ........................ 10-2014-0120850

(51) Int. Cl.
| | |
|---|---|
| *G09G 5/02* | (2006.01) |
| *G09G 5/06* | (2006.01) |
| *G09G 5/10* | (2006.01) |
| *G06T 11/40* | (2006.01) |
| *G06T 5/00* | (2006.01) |
| *G06T 11/00* | (2006.01) |
| *G06T 3/40* | (2006.01) |

(Continued)

(52) U.S. Cl.
CPC .............. *G06T 11/40* (2013.01); *G06T 5/009* (2013.01); *G06T 5/40* (2013.01); *G06T 2207/10024* (2013.01); *G06T 2207/20208* (2013.01)

(58) Field of Classification Search
CPC combination set(s) only.
See application file for complete search history.

(56) References Cited

U.S. PATENT DOCUMENTS 4,926,247 A * 5/1990 Nagasaki ................. H04N 9/68
257/232
5,039,210 A * 8/1991 Welstead ............... G09G 3/001
235/454

(Continued)

FOREIGN PATENT DOCUMENTS

JP 5153566 B2 2/2013
KR 10-2008-0037046 A 4/2008

(Continued)

*Primary Examiner* — Wesner Sajous
(74) *Attorney, Agent, or Firm* — Sughrue Mion, PLLC

(57) ABSTRACT

A method for controlling an electronic apparatus includes determining representative colors of pixels of a received image frame; calculating input dynamic ranges for respective representative colors based on brightness information of the received image frame; expanding a dynamic range for the representative colors based on at least one of the brightness information of the received image frame and display characteristics of the electronic apparatus; and outputting an image frame having adjusted brightness based on the expanded dynamic range.

23 Claims, 11 Drawing Sheets

(51) Int. Cl.
*H04N 1/60* (2006.01)
*H04N 5/202* (2006.01)
*H04N 9/69* (2006.01)
*H04N 5/57* (2006.01)
*G06T 5/40* (2006.01)

(56) References Cited

U.S. PATENT DOCUMENTS

| | | | | |
|---|---|---|---|---|
| 5,577,242 A | * | 11/1996 | Yamaguchi | G06F 17/30067 |
| 5,801,773 A | * | 9/1998 | Ikeda | H04N 5/20 |
| | | | | 348/229.1 |
| 5,959,696 A | * | 9/1999 | Hwang | G06T 5/009 |
| | | | | 348/222.1 |
| 6,204,881 B1 | * | 3/2001 | Ikeda | H04N 5/20 |
| | | | | 348/229.1 |
| 6,879,731 B2 | | 4/2005 | Kang et al. | |
| 7,068,396 B1 | * | 6/2006 | Gallagher | H04N 1/407 |
| | | | | 250/208.1 |
| 7,408,558 B2 | | 8/2008 | Madden et al. | |
| 8,488,905 B2 | | 7/2013 | Hayase | |
| 2005/0231457 A1 | * | 10/2005 | Yamamoto | G09G 3/3413 |
| | | | | 345/102 |
| 2007/0035706 A1 | * | 2/2007 | Margulis | G03B 21/20 |
| | | | | 353/122 |
| 2008/0158398 A1 | * | 7/2008 | Yaffe | H04N 5/35581 |
| | | | | 348/294 |
| 2009/0141151 A1 | * | 6/2009 | Park | H04N 5/57 |
| | | | | 348/254 |
| 2011/0194021 A1 | * | 8/2011 | Jacumet | G03B 15/00 |
| | | | | 348/365 |
| 2013/0114000 A1 | | 5/2013 | Atkins | |
| 2014/0086485 A1 | | 3/2014 | Min | |
| 2015/0249795 A1 | * | 9/2015 | Cho | H04N 5/3572 |
| | | | | 348/229.1 |
| 2016/0057333 A1 | * | 2/2016 | Liu | H04N 5/2355 |
| | | | | 348/239 |

FOREIGN PATENT DOCUMENTS

| | | |
|---|---|---|
| KR | 10-1026577 B1 | 3/2011 |
| KR | 10-2013-0058034 A | 6/2013 |

\* cited by examiner

FIG. 4

| Input | | | Output | | |
|---|---|---|---|---|---|
| 0 | 0 | 0 | Gain_black | Gain_black | Gain_black |
| 255 | 255 | 255 | 255*Gain_White | 255*Gain_White | 255*Gain_White |
| 255 | 0 | 0 | 255*Gain_red | 0 | 0 |
| 0 | 255 | 0 | 0 | 255*Gain_green | 0 |
| 0 | 0 | 255 | 0 | 0 | 255*Gain_blue |
| 0 | 255 | 255 | 0 | 255*Gain_cyan | 255*Gain_cyan |
| 255 | 0 | 255 | 255*Gain_magenta | 0 | 255*Gain_magenta |
| 255 | 255 | 0 | 255*Gain_yellow | 255*Gain_yellow | 0 |

FIG. 5

| Input | | | Output | | |
|---|---|---|---|---|---|
| 0 | 0 | 0 | -20 | -20 | -18 |
| 255 | 255 | 255 | 300 | 300 | 300 |
| 255 | 0 | 0 | 320 | 0 | 20 |
| 0 | 255 | 0 | 0 | 280 | 0 |
| 0 | 0 | 255 | 0 | 10 | 330 |
| 0 | 255 | 255 | 0 | 270 | 280 |
| 255 | 0 | 255 | 270 | 0 | 270 |
| 255 | 255 | 0 | 280 | 280 | 0 |

ELECTRONIC APPARATUS AND METHOD FOR CONTROLLING THE SAME

CROSS-REFERENCE TO RELATED APPLICATIONS

This application claims the benefit of U.S. Provisional Patent Application No. 62/023,473, filed on Jul. 11, 2014, and claims priority from Korean Patent Application No. 10-2014-0120850, filed on Sep. 12, 2014, in the Korean Intellectual Property Office, the disclosures of which are incorporated herein by reference in their entireties.

BACKGROUND

1. Field

Apparatuses and methods consistent with exemplary embodiments relate to an electronic apparatus and a method for controlling the same, and more particularly, to an electronic apparatus for expanding a dynamic range based on a color distribution of a received image frame and a color gamut representation range of an output device, and a method for controlling the same.

2. Description of the Related Art

Because of the needs of users for a better image quality, a dynamic range of the electronic apparatus may be expanded upon outputting an image. A related art electronic apparatus expands the dynamic range so that the maximum and minimum ranges of a histogram are adjusted depending on brightness information of the image.

According to the related art, the dynamic range is expanded so that the maximum and minimum values of the histogram are determined depending on the brightness information of the image. However, in the case in which a letterbox, a text, and the like including black or white components are present in the image frame, the dynamic range of the image frame has values which are close to 0 and to 255, i.e., in a case of an 8-bit system with the maximum dynamic range from 0 to 255. Thus, since the dynamic range might not be adequately expanded, a degree of improvement of the image quality may be insufficient.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

One or more exemplary embodiments provide an electronic apparatus capable of providing clearer image quality to a user by expanding a dynamic range for each color based on information on a received input image and a color representation range of the electronic apparatus, and a method for controlling the same.

According to an aspect of an exemplary embodiment, a method for controlling an electronic apparatus includes determining representative colors of a plurality of pixels in a received image frame by analyzing the received image frame; calculating input dynamic ranges for a plurality of representative colors based on brightness information of the received image frame; expanding a dynamic range for each representative color based on at least one of the brightness information of the received image frame and display characteristics of the electronic apparatus; and outputting an image frame having adjusted brightness based on the expanded dynamic range.

The determining of the representative colors may include determining at least one of color values and saturation values for the plurality of pixels; determining whether or not the plurality of pixels are a chromatic color or a neutral color based on at least one of the color values and the saturation values; and determining a representative color of each of pixels determined as the chromatic color among the plurality of pixels.

In the determining of whether or not the plurality of pixels are the chromatic color or the neutral color, pixels of which the color values are not defined or the saturation values are a preset value or less may be determined as the neutral color, and pixels of which the saturation values exceed the preset value may be determined as the chromatic color.

The calculating of the input dynamic ranges may include determining a maximum brightness value and a minimum brightness value for each of the representative colors included in the received image frame by analyzing the received image frame; determining a minimum value of the minimum brightness values for the representative colors as a minimum brightness value of the image frame; and calculating the input dynamic ranges of the plurality of representative colors by determining the minimum brightness value of the image frame as a minimum value of the representative colors and determining the maximum brightness value of each of the representative colors included in the image frame as a maximum value of the representative colors.

The expanding of the dynamic range may include calculating a maximum gain value for each representative color using a ratio of a brightness value which is maximally output for each representative color and a maximum brightness value of each of the representative colors included in the image frame.

The expanding of the dynamic range may include determining weight for each representative color based on color characteristics which are output by the electronic apparatus and user preferences; calculating a final gain value for each representative color by applying the weight to the calculated maximum gain value; and expanding the dynamic range for each representative color by applying the final gain value to the input dynamic range for each representative color.

In the determining of the weight, the weight for each representative color may be determined by based on maximum gain values of representative colors which are adjacent to each other.

The expanding of the dynamic range may further include calculating a gain value between the representative colors by interpolating gain values for the representative colors.

The method may further include selecting a region for expanding the dynamic range of the received image frame, wherein in the determining of the representative colors of the plurality of pixels, the representative colors of the plurality of pixels included in the selected region are determined.

According to another aspect of an exemplary embodiment, an electronic apparatus includes a receiver configured to receive an image frame; a representative color determiner configured to determine representative colors of a plurality of pixels in the received image frame by analyzing the received image frame; an input dynamic range calculator configured to calculate input dynamic ranges for a plurality of representative colors based on brightness information of the received image frame; a dynamic range expander configured to expand a dynamic range for each representative color based on at least one of the brightness information of the received image frame and display characteristics of the electronic apparatus; and an output unit configured to output an image frame having adjusted brightness based on the expanded dynamic range.

The representative color determiner may determine at least one of color values and saturation values for the plurality of pixels, determine whether or not the plurality of pixels are a chromatic color or a neutral color based on at least one of the color values and the saturation values, and determine a representative color of each of pixels determined as the chromatic color among the plurality of pixels.

The representative color determiner may determine pixels of which the color values are not defined or the saturation values are a preset value or less as the neutral color and determine pixels of which the saturation values exceed the preset value as the chromatic color.

The input dynamic range calculator may determine a maximum brightness value and a minimum brightness value for each of the representative colors included in the received image frame by analyzing the received image frame, determine a minimum value of the minimum brightness values for the representative colors as a minimum brightness value of the image frame, and calculate the input dynamic ranges of the plurality of representative colors by determining the minimum brightness value of the image frame as a minimum value of the representative colors and determining the maximum brightness value of each of the representative colors included in the image frame as a maximum value of the representative colors.

The dynamic range expander may calculate a maximum gain value for each representative color using a ratio of a brightness value which is maximally output for each representative color and a maximum brightness value of each of the representative colors included in the image frame.

The dynamic range expander may determine weight for each representative color based on color characteristics which are output by the electronic apparatus and user preferences, calculate a final gain value for each representative color by applying the weight to the calculated maximum gain value, and expand the dynamic range for each representative color by applying the final gain value to the input dynamic range.

The dynamic range expander may determine the weight for each representative color by based on maximum gain values of representative colors which are adjacent to each other.

The dynamic range expander may calculate a gain value between the representative colors by interpolating gain values for the representative colors.

The electronic apparatus may further include a region selector configured to select a region for expanding the dynamic range of the received image frame, wherein the representative color determiner determines the representative colors of the plurality of pixels included in the selected region.

BRIEF DESCRIPTION OF THE DRAWING

The above and/or other aspects will be more apparent by describing certain exemplary embodiments with reference to the accompanying drawings, in which:

FIGS. 4 and 5 are diagrams illustrating a three-dimensional (3D) cube interpolation input value and an actual application example, according to an exemplary embodiment;

DETAILED DESCRIPTION OF EXEMPLARY EMBODIMENTS

Figure 1:
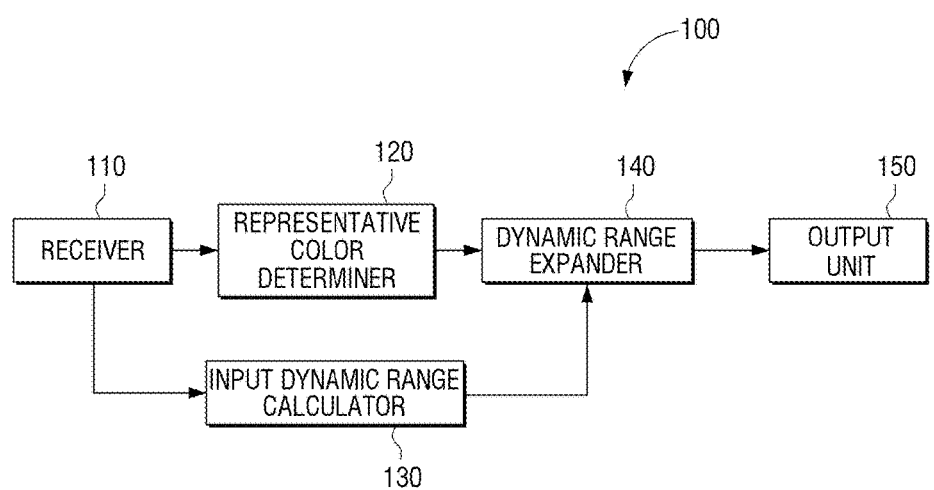
FIG. 1 is a block diagram showing a configuration of an electronic apparatus according to an exemplary embodiment.

Certain exemplary embodiments are described in greater detail below with reference to the accompanying drawings.

In the following description, the same drawing reference numerals are used for the same elements even in different drawings. Thus, description of the same elements is not repeated.

The matters defined in the description, such as detailed construction and elements, are provided to assist in a comprehensive understanding of exemplary embodiments. Thus, it is apparent that exemplary embodiments can be carried out without those specifically defined matters. Also, well-known functions or constructions are not described in detail since they would obscure exemplary embodiments with unnecessary detail.

The terms "first", "second", etc. may be used to describe diverse components, but the components are not limited by the terms. The terms are only used to distinguish one component from the others.

The terms used in the present application are only used to describe the exemplary embodiments, but are not intended to be limiting. The singular expression also includes the plural meaning as long as it does not differently mean in the context. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

In the exemplary embodiment, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor.

FIG. 1 is a block diagram showing a configuration of an electronic apparatus 100 according to an exemplary embodiment. As shown in FIG. 1, the electronic apparatus 100 may include a receiver 110, a representative color determiner 120, an input dynamic range calculator 130, a dynamic range expander 140, and an output unit 150. The electronic apparatus 100 may be implemented with various apparatus such as a digital TV, a desktop PC, a notebook PC, a tablet PC, a smartphone, a kiosk, a printing device, and the like capable of outputting an image frame, for example on a monitor or a display (not shown).

The receiver 110 receives the image frame. In this case, the received image frame may be represented by one of a RGB model, a YCbCr model, and a HSV model.

The RGB model represents the color by a combination of three components of red, green, and blue. In the RGB model, red is represented by R=255 and G=B=0, green is represented by G=255 and R=B=0, blue is represented by B=255 and R=G=0, and yellow is represented by R=G=255 and B=0. Further, black is represented by R=G=B=0, and white is represented by R=G=B=255, and, generally, various shades of a gray color, which is a neutral color, are represented by R=G=B. Since each of R, G, and B may have values between 0 and 255, a total of colors of 256*256*256=16,777,216 may be represented when the RGB color model is used.

The YCbCr model is a color model in which brightness component Y and chrominance information Cb and Cr are separated and represented in the RGB colors. In the YCbCr model, Y, Cb, and Cr each have values between 0 and 255. Here, if Y is increased, it generally brightens the color, and if Y is decreased, the color generally becomes darker. The YCbCr model is a color model used for MPEG and compresses video in a scheme in which a large number of bits are allocated to Y and a small number of bits are allocated to Cb and Cr using a fact that eyes of human are sensitive to a brightness difference, but are relatively insensitive to the chrominance. Thus, in the case in which the YCbCr model is used when video data is processed, a color conversion does not need to be separately performed.

The HSV model represents the color by three components of hue, saturation, and value. The hue indicates a type or a series of the color, e.g., red series, blue series, etc., the saturation indicates a degree of purity of the color, and the value indicates intensity of the color. In the case of HSV model, H, S, and V are each represented by values between 0 and 255. Since the H values indicate a kind of color, a value amount thereof is meaningless and indicates an index. If the S value is 0, it indicates the neutral color (gray color) and if the S value is 255, it indicates a purest color. As the V value is decreased, it indicates a darker color, and as the V value is increased, it indicates a brighter color. The HSV color model has a conic shape or a cylindrical shape.

The representative color determiner 120 determines representative colors of a plurality of pixels in the image frame by analyzing the received image frame.

Specifically, the representative color determiner 120 may determine at least one of a color value H and a saturation value Chroma for the plurality of pixels included in the received image frame by selecting one or more of the following Mathematical expressions 1 to 4, depending on tolerance of complexity of the electronic apparatus 100.

$$H' = \begin{cases} \text{undefined}, & \text{if } C = 0 \\ \frac{G-B}{C} \bmod 6, & \text{if } M = R \\ \frac{B-R}{C} + 2, & \text{if } M = G \\ \frac{R-G}{C} + 4, & \text{if } M = B \end{cases} \quad \text{[Mathematical expression 1]}$$

$$H = 60° \times H'$$

$$H = \tan^{-1}(Cr/Cb) \quad \text{[Mathematical expression 2]}$$

In this case, values of Cb and Cr may be the values defined by BT 601 standard or BT 709 standard. For example, according to Mathematical expression of BT 601, Cb is −0.1482*R−0.2909*G+0.4392*B and Cr is 0.4392*R−0.3678*G−0.0714*B, and according to Mathematical expression of BT 709, Cb is −0.1687*R−0.3313*G+0.5*B and Cr is 0.5*R−0.4187*G−0.0813*B.

$$H = \tan^{-1}(\beta/\alpha) \quad \text{[Mathematical expression 3]}$$

In this case, α is (2*R−G−B)/2 and β is sqrt(3)/2*(G−B).

$$\text{Chroma1} = \sqrt{(Cb^2 + Cr^2)}$$

$$\text{Chroma2} = |Cb| + |Cr|$$

$$\text{Chroma3} = \sqrt{(\alpha^2 + \beta^2)}$$

$$\text{Chroma4} = |\alpha| + |\beta|$$

$$\text{Chroma5} = \max(R,G,B) - \min(R,G,B) \quad \text{[Mathematical expression 4]}$$

The representative color determiner 120 may determine whether or not the plurality of pixels are a chromatic color or a neutral color, based on the color value H and the saturation value Chroma. Specifically, the representative color determiner 120 may determine pixels of which the color value H is not defined (i.e., in a case of R=G=B) or the saturation value is a preset value or less, as the neutral color, and determine pixels of which the saturation value is the preset value or more, as the chromatic color.

The representative color determiner 120 may determine representative colors for the pixels which are determined as the chromatic color, among the plurality of pixels included in the image frame. Specifically, the representative color determiner 120 may classify the representative colors into red (R), yellow (Y), green (G), cyan (C), blue (B), and magenta (M) by the following Mathematical expression 5 depending on the calculated color value H.

R, if: −30−Th<H<30+Th

Y, if: 90−Th<H<90+Th

G, if: 150−Th<H<150+Th

C, if: 210−Th<H<210+Th

B, if: 270−Th<H<270+Th

M, if: 330−Th<H<330+Th   [Mathematical expression 5]

For example, a threshold value Th may have values between 0 and 30.

As described above, according to an exemplary embodiment, the representative color may be one of red, yellow, green, cyan, blue, and magenta, but this is merely an example. For example, the representative colors may be set from three to twelve colors depending on complexity and/or operational performance of the electronic apparatus 100.

The representative color determiner 120 may calculate brightness values Y for the plurality of pixels included in the received image frame using values of R, G, and B, and weights as shown in Mathematical expression 6 and may store the brightness values for the neutral color and each representative color as shown in Mathematical expression 7.

$$Y = \frac{(w1*R + w2*G + w3*B)}{w1 + w2 + w3}$$ [Mathematical expression 6]

$$Y_N = Y, \text{ if: neutral color}$$ [Mathematical expression 7]
$$Y_R = Y, \text{ if: } -30 - Th < H < 30 + Th$$
$$Y_Y = Y, \text{ if: } 90 - Th < H < 90 + Th$$
$$Y_G = Y, \text{ if: } 150 - Th < H < 150 + Th$$
$$Y_C = Y, \text{ if: } 210 - Th < H < 210 + Th$$
$$Y_B = Y, \text{ if: } 270 - Th < H < 270 + Th$$
$$Y_M = Y, \text{ if: } 330 - Th < H < 330 + Th,$$

where $Y_N$ is a brightness value of a pixel of a neutral color,
$Y_R$ is a brightness value of a pixel of a red color,
$Y_Y$ is a brightness value of a pixel of a yellow color,
$Y_G$ is a brightness value of a pixel of a green color,
$Y_C$ is a brightness value of a pixel of a cyan color,
$Y_B$ is a brightness value of a pixel of a blue color,
$Y_M$ is a brightness value of a pixel of a magenta color.

The input dynamic range calculator 130 calculates an input dynamic range for a plurality of representative colors based on brightness information of the received image frame.

Specifically, the input dynamic range calculator 130 may determine a maximum brightness value and a minimum brightness value for each of the representative colors of the pixels included in the received image frame by analyzing the received image frame. For example, the input dynamic range calculator 130 may calculate the maximum brightness value and the minimum brightness value for each representative color according to the following Mathematical expression 8.

$$Y_{N_{min}} = \min(Y_N), Y_{N_{max}} = \max(Y_N)$$

$$Y_{R_{min}} = \min(Y_R), Y_{R_{max}} = \max(Y_R)$$

$$Y_{Y_{min}} = \min(Y_Y), Y_{Y_{max}} = \max(Y_Y)$$

$$Y_{G_{min}} = \min(Y_G), Y_{G_{max}} = \max(Y_G)$$

$$Y_{C_{min}} = \min(Y_C), Y_{C_{max}} = \max(Y_C)$$

$$Y_{B_{min}} = \min(Y_B), Y_{B_{max}} = \max(Y_B)$$

$$Y_{M_{min}} = \min(Y_M), Y_{M_{max}} = \max(Y_M)$$ [Mathematical expression 8]

The input dynamic range calculator 130 may determine a minimum value of the minimum brightness values for the representative colors as a minimum brightness value ($Y_{f\_min}$) of the image frame as in the following Mathematical expression 9.

$$Y_{f_{min}} = \min(Y_{N_{min}}, Y_{R_{min}}, Y_{Y_{min}}, Y_{G_{min}}, Y_{C_{min}}, Y_{B_{min}}, Y_{M_{min}})$$ [Mathematical expression 9]

The input dynamic range calculator 130 may determine the input dynamic range for the plurality of representative colors by determining a minimum brightness value of the image frame as a minimum value of the representative colors and determining a maximum brightness value of each of the representative colors included in the image frame as a maximum value of the representative colors, as in the following Mathematical expression 10.

$$Y_R: \text{ from } Y_{f_{min}} \text{ to } Y_{R_{max}}$$

$$Y_Y: \text{ from } Y_{f_{min}} \text{ to } Y_{Y_{max}}$$

$$Y_G: \text{ from } Y_{f_{min}} \text{ to } Y_{G_{max}}$$

$$Y_C: \text{ from } Y_{f_{min}} \text{ to } Y_{C_{max}}$$

$$Y_B: \text{ from } Y_{f_{min}} \text{ to } Y_{B_{min}}$$

$$Y_M: \text{ from } Y_{f_{min}} \text{ to } Y_{M_{max}}$$

$$Y_N: \text{ from } Y_{f_{min}} \text{ to } Y_{N_{max}}$$ [Mathematical expression 10]

Figure 2A:
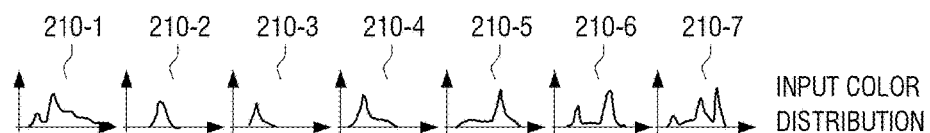
FIGS. 2A and 2B are graphs illustrating input brightness distribution and output brightness distribution for each representative color, according to an exemplary embodiment.

For example, the input dynamic range calculator 130 may calculate an input dynamic range 210-1 for the neural color, an input dynamic range 210-2 for red, an input dynamic range 210-3 for yellow, an input dynamic range 210-4 for green, an input dynamic range 210-5 for cyan, an input dynamic range 210-6 for blue, and an input dynamic range 210-7 for magenta, as shown in FIG. 2A.

The dynamic range expander 140 expands the dynamic range for each representative color based on at least one of the brightness information of the received image frame and display characteristics of the electronic apparatus.

First, the dynamic range expander 140 may calculate a maximum gain value for each representative color using a ratio of a brightness value which may be maximally output for each representative color and a maximum brightness value of each of the representative colors included in the image frame.

Specifically, a full dynamic range for each representative color is a brightness value which may be maximally represented for each representative color. Here, in the case in which the maximum value of the pixel is represented as 1, the full dynamic range for each representative color is defined (1,0,0) for red, (1,1,0) for yellow, (0,1,0) for green, (0,1,1) for cyan, (0,0,1) for blue, and (1,0,1) for magenta, which may be represented as $YR_{Full}$, $YY_{Full}$, $YG_{Full}$, $YC_{Full}$, $YB_{Full}$, $YM_{Full}$, respectively, in Mathematical expression 11. The full dynamic range for the gray color may be represented as $YN_{Full}$. The dynamic range expander 140 may calculate a maximum gain value for each representative color according to the following Mathematical expression 11 to expand the input dynamic range while maintaining a color balance up to the dynamic range which may be maximally represented for the input dynamic range.

$$Gain_{R_{max}} = Y_{R_{max}} / Y_{R_{Full}}$$

$$Gain_{Y_{max}} = Y_{Y_{max}} / Y_{Y_{Full}}$$

$$Gain_{G_{max}} = Y_{G_{max}} / Y_{G_{Full}}$$

$$Gain_{C_{max}} = Y_{C_{max}} / Y_{C_{Full}}$$

$$Gain_{B_{max}} = Y_{B_{max}} / Y_{B_{Full}}$$

$$Gain_{M_{max}} = Y_{M_{max}} / Y_{M_{Full}}$$

$$Gain_{N_{max}} = Y_{N_{max}} / Y_{N_{Full}}$$ [Mathematical expression 11]

The dynamic range expander 140 may determine weights for each representative color based on color characteristics which may be output by the electronic apparatus 100 and user preferences. The dynamic range expander 140 may calculate a final gain value for each representative color by applying the weights to the calculated maximum gain value, as in Mathematical expression 12.

$$Gain_R = weight_R * Gain_{R_{max}}$$

$$Gain_Y = weight_Y * Gain_{Y_{max}}$$

$$Gain_G = weight_G * Gain_{G_{max}}$$

$$Gain_B = weight_B * Gain_{B_{max}}$$

$$Gain_M = weight_M * Gain_{M_{max}}$$

$$Gain_N = weight_N * Gain_{N_{max}}, \quad \text{[Mathematical expression 12]}$$

where $weight_R$, $weight_Y$, $weight_G$, $weight_C$, $weight_B$, $weight_M$, and $weight_N$ are the weights for each representative color and may be set to one of values between 0 and 1 depending on color characteristics which may be output by the electronic apparatus 100 and user preferences.

Figure 2B:
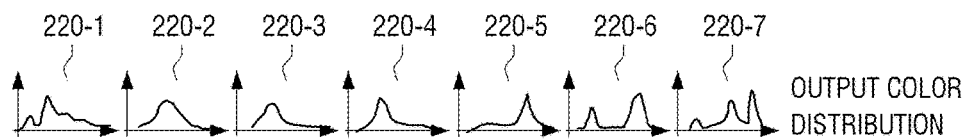

The dynamic range expander 140 may expand the dynamic range for each representative color by applying the final gain value to the input dynamic range for each representative color. Specifically, the dynamic range expander 140 may calculate an output dynamic range 220-1 for the neural color, an output dynamic range 220-2 for red, an output dynamic range 220-3 for yellow, an output dynamic range 220-4 for green, an output dynamic range 220-5 for cyan, an output dynamic range 220-6 for blue, and an output dynamic range 220-7 for magenta as shown in FIG. 2B, by multiplying the input dynamic range for each representative color with the final gain value for each representative color.

In the case in which a final gain value of a specific representative color is substantially different from a final gain value of another representative color, only a specific color gamut is greatly expanded, which may cause an unnatural result. Thus, the dynamic range expander 140 may restrictedly adjust the gain value for each representative color with reference to final gain values of the representative colors whose color spaces are adjacent to each other, as shown in the following Mathematical expression 13.

$$weight_R = (w1*Gain_{Y_{max}} + w2*Gain_{R_{max}} + w3*Gain_{M_{max}})/(w1+w2+w3)$$

$$weight_Y = (w1*Gain_{G_{max}} + w2*Gain_{Y_{max}} + w3*Gain_{R_{max}})/(w1+w2+w3)$$

$$weight_G = (w1*Gain_{C_{max}} + w2*Gain_{G_{max}} + w3*Gain_{Y_{max}})/(w1+w2+w3)$$

$$weight_C = (w1*Gain_{B_{max}} + w2*Gain_{C_{max}} + w3*Gain_{G_{max}})/(w1+w2+w3)$$

$$weight_B = (w1*Gain_{M_{max}} + w2*Gain_{B_{max}} + w3*Gain_{C_{max}})/(w1+w2+w3)$$

$$weight_M = (w1*Gain_{R_{max}} + w2*Gain_{M_{max}} + w3*Gain_{B_{max}})/(w1+w2+w3) \quad \text{[Mathematical expression 13]}$$

Figure 3:
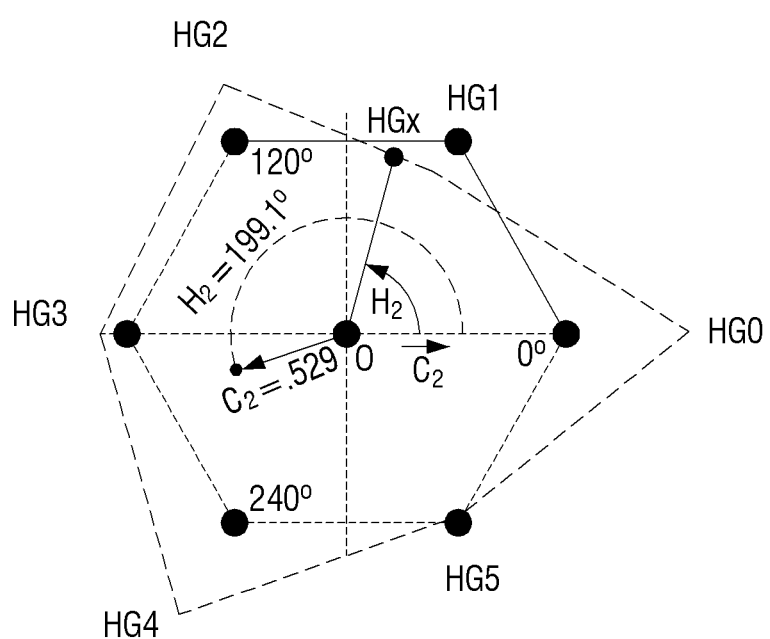
FIG. 3 is a diagram illustrating a method for calculating a gain value by interpolating the gain value for each representative color, according to an exemplary embodiment.

The dynamic range expander 140 may calculate a gain value between the representative colors by interpolating the gain values for the representative colors. Specifically, as shown in FIG. 3, when a gain for each representative color is calculated, the dynamic range expander 140 may calculate a gain value (HGx) between the representative colors by performing an interpolation as in the following Mathematical expression 14.

$$HGx = HG1 + (H2 - 60)\frac{HG2 - HG1}{120 - 60} \quad \text{[Mathematical expression 14]}$$

In this case, HGx is Gain_R for Hue=0.

A color gamut expand gain value for additionally brightened brightness is given as Weight_gamut, which may have [1.0~Hue_gain].

In addition, a method for expanding the dynamic range by the dynamic range expander 140 when a dynamic range expand gain for each representative color is given may be determined according to one of the following Mathematical expressions 15 to 17 based on at least one of complexity of the electronic apparatus 100 and the color models.

$$[R,G,B,]\text{-}2[HGx*R, HGx*G, HGx*B] \quad \text{[Mathematical expression 15]}$$

$$[Y,Cb,Cr]\text{-}2[HGx*Y, Weight_{gamut}*Cb, Weight_{gamut}*Cr] \quad \text{[Mathematical expression 16]}$$

$$[H,S,V]\text{-}2[H, Weight_{gamut}*S, HGx*V] \quad \text{[Mathematical expression 17]}$$

Figure 6:
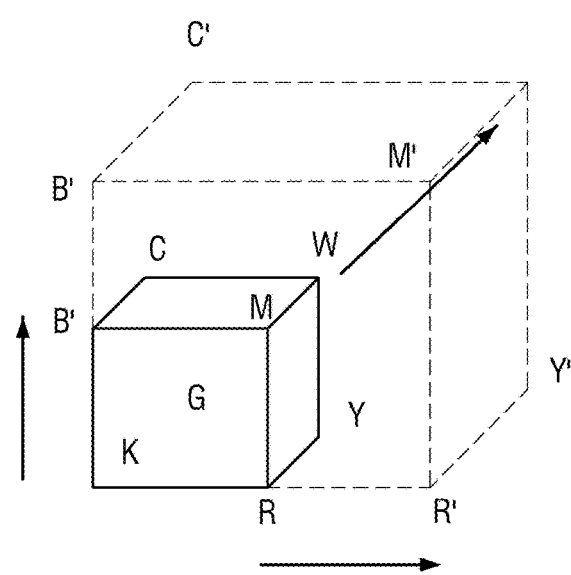
FIG. 6 is a diagram illustrating a 3D interpolation according to an exemplary embodiment.

The dynamic range expander 140 performs a 3D interpolation as shown in FIG. 6. Specifically, the dynamic range expander 140 interpolates intermediate values by mapping target points to coordinates of the representative colors using a tetrahedral interpolation method. FIG. 4 is a diagram showing input values and output values in the case in which a 3D interpolation is performed, and FIG. 5 is a diagram showing actual input values and actual output values in the case in which the gain value is defined for each representative color.

The output unit 150 outputs an image frame having adjusted brightness based on the expanded dynamic range. In this case, the output unit 150 may display the image frame having adjusted brightness by performing a display processing operation and may also print the image frame having adjusted brightness by performing a print processing operation.

As described above, it is possible to provide a clearer image quality to the user by expanding the dynamic range for each color based on information on the received image and a color representation range of the electronic apparatus 100. In addition, a phenomenon in which the dynamic range is not expanded at a color gamut boundary and is moved to peripheral colors may be substantially eliminated.

Figure 7:
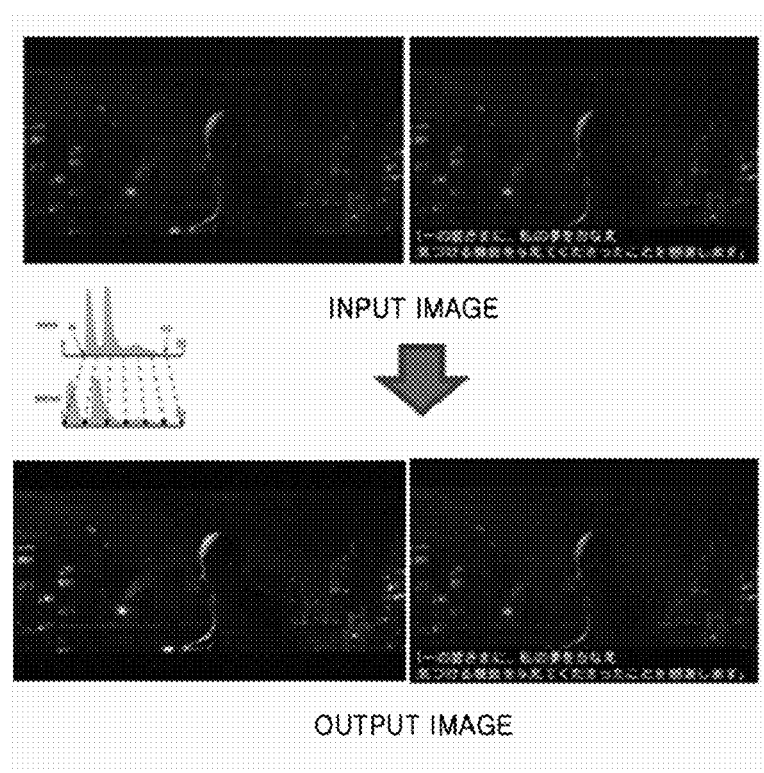
FIG. 7 is a diagram for comparing an input image and an output image according to a method for expanding a dynamic range according to the related art.
Figure 8:
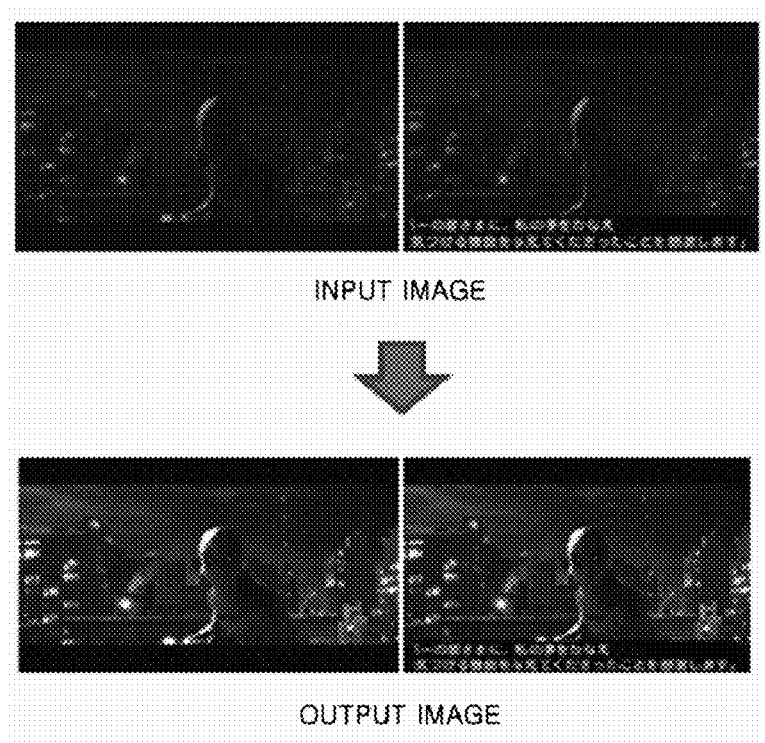
FIG. 8 is a diagram for comparing an input image and an output image according to a method for expanding a dynamic range according to an exemplary embodiment.

FIGS. 7 and 8 are diagrams illustrating results obtained by processing the image frame by a method for expanding a dynamic range according to the related art and a method for expanding a dynamic range according to an exemplary embodiment. As shown in FIG. 7, in the case in which a large amount of black or white components are included in the received image frame, since it is difficult to substantially expand the dynamic range, there is a problem that a degree of improving the image quality of the output image frame is small. However, according to the exemplary embodiment, since the dynamic range is expanded for each representative color, it may be seen in FIG. 8 that the degree of improving the image quality of the output image frame is increased as compared to the related art even in the case in which a large amount of black or white components are included in the received image frame.

Figure 9:
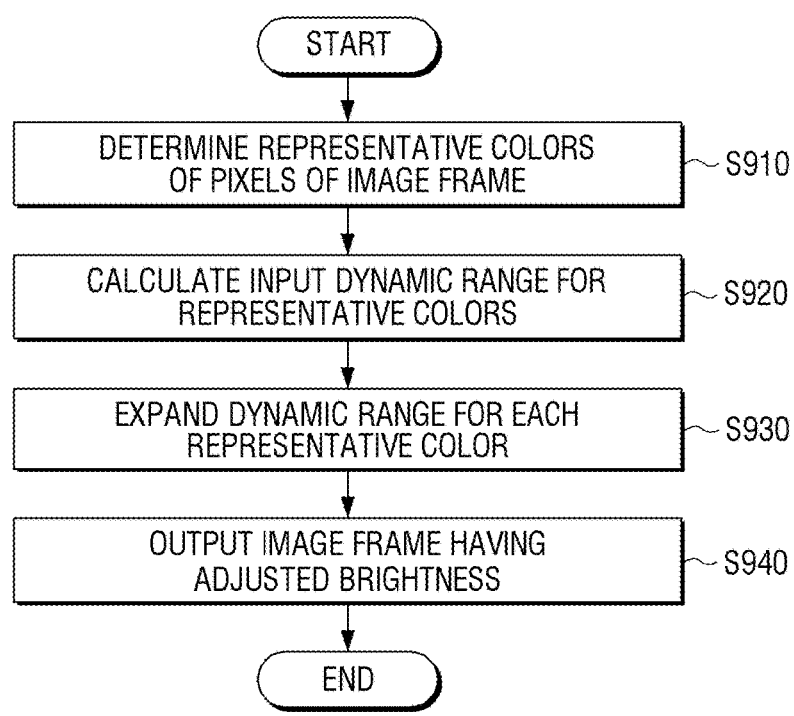
FIG. 9 is a flowchart illustrating a method for expanding a dynamic range for each representative color, according to an exemplary embodiment.

Hereinafter, a method for controlling an electronic apparatus for expanding the dynamic range according to an exemplary embodiment will be described with reference to FIG. 9.

First, the electronic apparatus 100 determines representative colors of a plurality of pixels included in the image frame by analyzing the received image frame (operation S910). Specifically, the electronic apparatus 100 may determine at least one of color values and saturation values for a plurality of pixels, determine whether or not the plurality of pixels are a chromatic color or a neutral color based on at least one of the color values and the saturation values, and determine the respective representative colors for pixels which are determined as the chromatic color among the plurality of pixels.

The electronic apparatus 100 calculates input dynamic ranges for a plurality of representative colors based on brightness information of the received image frame (operation S920). Specifically, the electronic apparatus 100 may determine a maximum brightness value and a minimum brightness value for each of the representative colors included in the received image frame by analyzing the received image frame, determine a minimum value of the minimum brightness values for the representative colors as a minimum brightness value of the image frame, and calculate the input dynamic ranges of the plurality of representative colors by determining the minimum brightness value of the image frame as a minimum value of the representative colors and determining a maximum brightness value of each of the representative colors included in the image frame as a maximum value of the representative colors.

The electronic apparatus 100 may expand the dynamic range for each representative color based on at least one of the brightness information of the received image frame and display characteristics of the electronic apparatus (operation S930). Specifically, the electronic apparatus 100 may calculate a maximum gain value for each representative color using a ratio of a brightness value which may be maximally output for each representative color and a maximum brightness value of each of the representative colors included in the image frame. The electronic apparatus 100 may expand the dynamic range for each representative color by determining weight for each representative color based on color characteristics which may be output by the electronic apparatus 100 and user preferences, calculating a final gain value for each representative color by applying the weight to the calculated maximum gain value, and applying the final gain value to the input dynamic range.

The electronic apparatus 100 outputs an image frame having adjusted brightness based on the expanded dynamic range (operation S940).

As described above, the electronic apparatus 100 may provide a clearer image quality to the user by expanding the dynamic range for each representative color.

Figure 10:
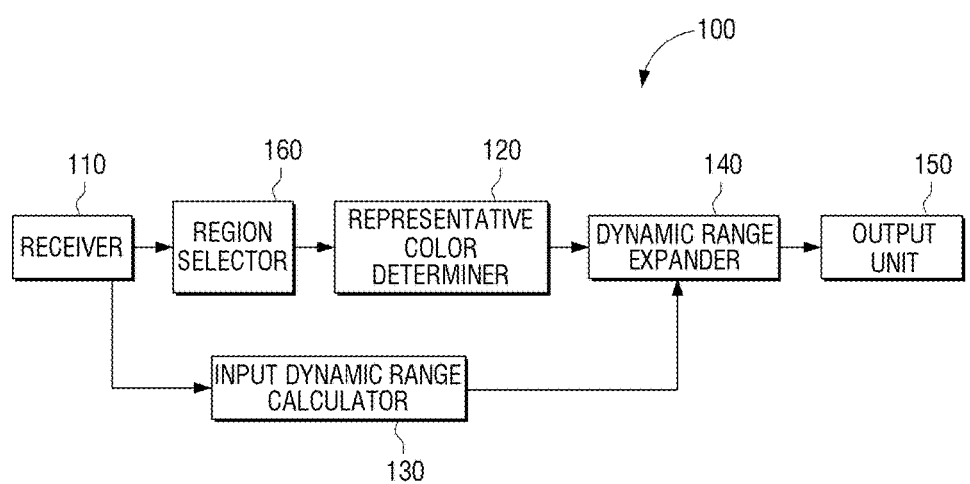
FIG. 10 is a block diagram showing a configuration of an electronic apparatus according to an exemplary embodiment.

Although the case in which the dynamic range is expanded for the overall pixels included in the received image frame has been described in the exemplary embodiment described above, this is merely one example. For example, the dynamic range of the pixel may be expanded for some regions of the image frame. Specifically, as shown in FIG. 10, the electronic apparatus 100 may further include a region selector 160 to select a region, of which the dynamic range is to be expanded, of the received image frame. In this case, the region selector 160 may select the regions which exclude a text region or a blank region.

The apparatus according to the exemplary embodiments may include a processor, a memory that stores and executes program data, a permanent storage such as a disk drive, a communication port that communicates with an external apparatus, and a user interface apparatus such as a touch panel, a key, and/or a button. The methods that are implemented with a software module or an algorithm are codes or program commands that are executable on the processor and readable by a computer, and may be stored in a recording medium readable by a computer. The recording medium readable by a computer may include a magnetic storage medium, for example, a read-only memory (ROM), a random-access memory (RAM), a floppy disk, a hard disk, etc., and an optical readable medium, for example, a compact disk read-only memory (CD-ROM), a digital versatile disk (DVD), etc. The recording medium readable by a computer may disperse in computer systems that are connected over a network so that a code readable by a computer may be stored and executed in a dispersion method. The medium may be readable by a computer, be stored in a memory, and be executed by a processor.

The exemplary embodiments may be represented by functional block components and diverse processing steps. The functional blocks may be implemented with diverse numbers of hardware and/or software components that execute specific functions. For example, an exemplary embodiment may employ direct circuit components, such as a memory, processing, logic, and a look-up table, that execute diverse functions by control of one or more microprocessors or other control apparatuses. As the components are executed as software programming or software elements, the exemplary embodiments may be written in a programming or scripting language such as C, C++, Java, and assembler, including algorithms that are implemented with data structure, processes, routines, or combination of other programming components. The functional factors may be implemented with an algorithm executed by one or more processors. The terms "mechanism", "element", "means", and "component" may be used in a broad sense, and are not limited to mechanical or physical components. These terms may include a set of routines of software that are executed by a processor.

According to various exemplary embodiments described above, it is possible to provide the clearer image quality to the user by expanding the dynamic range for each color based on the information on the received image and the color representation range of the electronic apparatus. In addition, a phenomenon in which the dynamic range is not expanded at a color gamut boundary and is moved to peripheral colors may be decreased.

For simplicity of the specification, electronic components, control systems, software, and other functional factors of the systems known to those skilled in the art are not described in detail. In addition, connection of lines or connection members between the components in the drawings illustrate functional connection and/or physical or circuital connection as example, and thus in an actual apparatus, replaceable or additional diverse functional connection, physical connection or circuital connection may be provided.

In this specification (especially in the claims), the use of the term "the" and similar referential terms may refer to both the singular and the plural. In addition, when a range is written, individual values within the range are included (if there is no contrary mention). Accordingly, it is the same as the individual values that compose the range are written in the detailed description. The steps that compose the method may be performed in appropriate order if the order is not obviously written or if there is no contrary mention.

The foregoing exemplary embodiments and advantages are merely exemplary and are not to be construed as limiting. Also, the description of the exemplary embodiments is intended to be illustrative, and not to limit the scope of the claims, and many alternatives, modifications, and variations will be apparent to those skilled in the art.

What is claimed is:

1. A method for controlling an electronic apparatus, the method comprising:
   determining representative colors of pixels of an image frame;
   calculating input dynamic range for each of the representative colors based on brightness information of the image frame;
   expanding the input dynamic range for each of the representative colors based on the brightness information of the image frame and display characteristics of the electronic apparatus; and
   outputting an image frame of which brightness is adjusted based on the expanded dynamic range.

2. The method as claimed in claim 1, wherein the determining the representative colors includes:
   determining at least one of color values and saturation values for the pixels;
   determining whether the pixels have a chromatic color or a neutral color based on at least one of the color values and the saturation values; and
   determining a type of the representative color of the pixels determined to have the chromatic color.

3. The method as claimed in claim 2, wherein the determining whether the pixels have the chromatic color or the neutral color comprises:
   determining the pixels whose color values are not defined or whose saturation values are equal to a preset value or less to have the neutral color, and
   determining the pixels whose saturation values exceed the preset value to have the chromatic color.

4. The method as claimed in claim 1, wherein the calculating the input dynamic ranges includes:
   determining a maximum brightness value and a minimum brightness value for each of the representative colors included in the received image frame;
   determining a minimum value of the minimum brightness values for the representative colors as a minimum brightness value of the image frame; and
   calculating the input dynamic ranges of the representative colors by determining a minimum value of each of the representative colors to be equal to the minimum brightness value of the image frame and a maximum value of said each of the representative colors to be equal to the maximum brightness value of said each of the representative colors included in the image frame.

5. The method as claimed in claim 1, wherein the expanding the dynamic range includes:
   calculating a maximum gain value for said each of the representative colors as a ratio between a brightness value, which is maximally output for said each of the representative colors, and a maximum brightness value of said each of the representative colors included in the image frame.

6. The method as claimed in claim 5, wherein the expanding the dynamic range includes:
   determining a weight for said each of the representative colors based on at least one of color characteristics, which are output by the electronic apparatus, and user preferences;
   calculating a final gain value for each representative color by applying the weight to the calculated maximum gain value; and
   expanding the dynamic range for each representative color by applying the final gain value to the input dynamic range for each representative color.

7. The method as claimed in claim 6, wherein the determining the weight comprises:
   determining the weight for each representative color based on the maximum gain values of the representative colors whose color spaces are adjacent to each other.

8. The method as claimed in claim 1, wherein the expanding the dynamic range further includes:
   calculating an interpolated gain value between the representative colors by interpolating gain values for the representative colors, and
   expanding the dynamic range by using the interpolated gain value.

9. The method as claimed in claim 1, further comprising selecting a region for expanding the dynamic range of the received image frame,
   wherein the determining the representative colors comprises determining the representative colors of the pixels included in the selected region.

10. The method as claimed in claim 1, wherein the expanding the input dynamic range comprises a three dimensional interpolation.

11. The method as claimed in claim 1, wherein the display characteristics of the electronic apparatus comprise at least one of brightness value which may be maximally output by the electronic apparatus and color characteristics that the electronic apparatus is capable of outputting.

12. An electronic apparatus comprising:
   a receiver configured to receive an image frame;
   a representative color determiner configured to determine representative colors of pixels of the received image frame;
   an input dynamic range calculator configured to calculate input dynamic range for each of the representative colors based on brightness information of the received image frame;
   a dynamic range expander configured to expand the input dynamic range for each of the representative colors based on the brightness information of the received image frame and display characteristics of the electronic apparatus; and
   an output unit configured to output the image frame of which brightness is adjusted based on the expanded dynamic range.

13. The electronic apparatus as claimed in claim 12, wherein the representative color determiner is configured to determine at least one of color values and saturation values for the pixels, determine whether the pixels have a chromatic color or a neutral color based on at least one of the color values and the saturation values, and determine a type of the representative color of the pixels determined to have the chromatic color.

14. The electronic apparatus as claimed in claim 13, wherein the representative color determiner is configured to determine the pixels whose color values are not defined or whose saturation values are equal to a preset value or less to have the neutral color, and determine the pixels whose saturation values exceed the preset value to have the chromatic color.

15. The electronic apparatus as claimed in claim 12, wherein the input dynamic range calculator is configured to determine a maximum brightness value and a minimum brightness value for each of the representative colors included in the received image frame, determine a minimum value of the minimum brightness values for the representative colors as a minimum brightness value of the image frame, and calculate the input dynamic ranges of the representative colors by determining a minimum value of each of the representative colors to be equal to the minimum brightness value of the image frame and a maximum value of said each of the representative colors to be equal to the maximum brightness value of said each of the representative colors included in the image frame.

16. The electronic apparatus as claimed in claim 12, wherein the dynamic range expander is configured to calculate a maximum gain value for said each of the representative colors as a ratio between a brightness value, which is maximally output for said each of the representative colors, and a maximum brightness value of said each of the representative colors included in the image frame.

17. The electronic apparatus as claimed in claim 16, wherein the dynamic range expander is configured to determine a weight for each representative color based on at least one of color characteristics, which are output by the electronic apparatus, and user preferences, calculate a final gain value for each representative color by applying the weight to the calculated maximum gain value, and expand the dynamic range for each representative color by applying the final gain value to the input dynamic range.

18. The electronic apparatus as claimed in claim 17, wherein the dynamic range expander is configured to determine the weight for each representative color based on the maximum gain values of the representative colors whose color spaces are adjacent to each other.

19. The electronic apparatus as claimed in claim 12, wherein the dynamic range expander is configured to calculate an interpolated gain value between the representative colors by interpolating gain values for the representative colors, and to expand the dynamic range by using the interpolated gain value.

20. The electronic apparatus as claimed in claim 12, further comprising a region selector configured to select a region for expanding the dynamic range of the received image frame,
wherein the representative color determiner is configured to determine the representative colors of the pixels included in the selected region.

21. An apparatus comprising:
a receiver configured to receive an input image frame having pixels;
a processor configured to determine representative colors of the pixels of the received image frame, calculate input dynamic range for each of the representative colors based on brightness information of the received image frame, and expand the input dynamic range for said each of the representative colors based on the brightness information of the image frame and display characteristics of the apparatus; and
a display configured to output an output image frame of which brightness is adjusted based on the expanded dynamic ranges.

22. The apparatus of claim 21, wherein the processor is configured to categorize the pixels of the input image frame into groups each having the pixels of a certain type of a chromatic color and into a group having the pixels of a neutral color including black pixels and white pixels.

23. The apparatus of claim 22, wherein the processor is configured to exclude the black pixels and the white pixels when performing an operation of expanding the input dynamic range for said each of the representative colors.

* * * * *